UNITED STATES PATENT OFFICE.

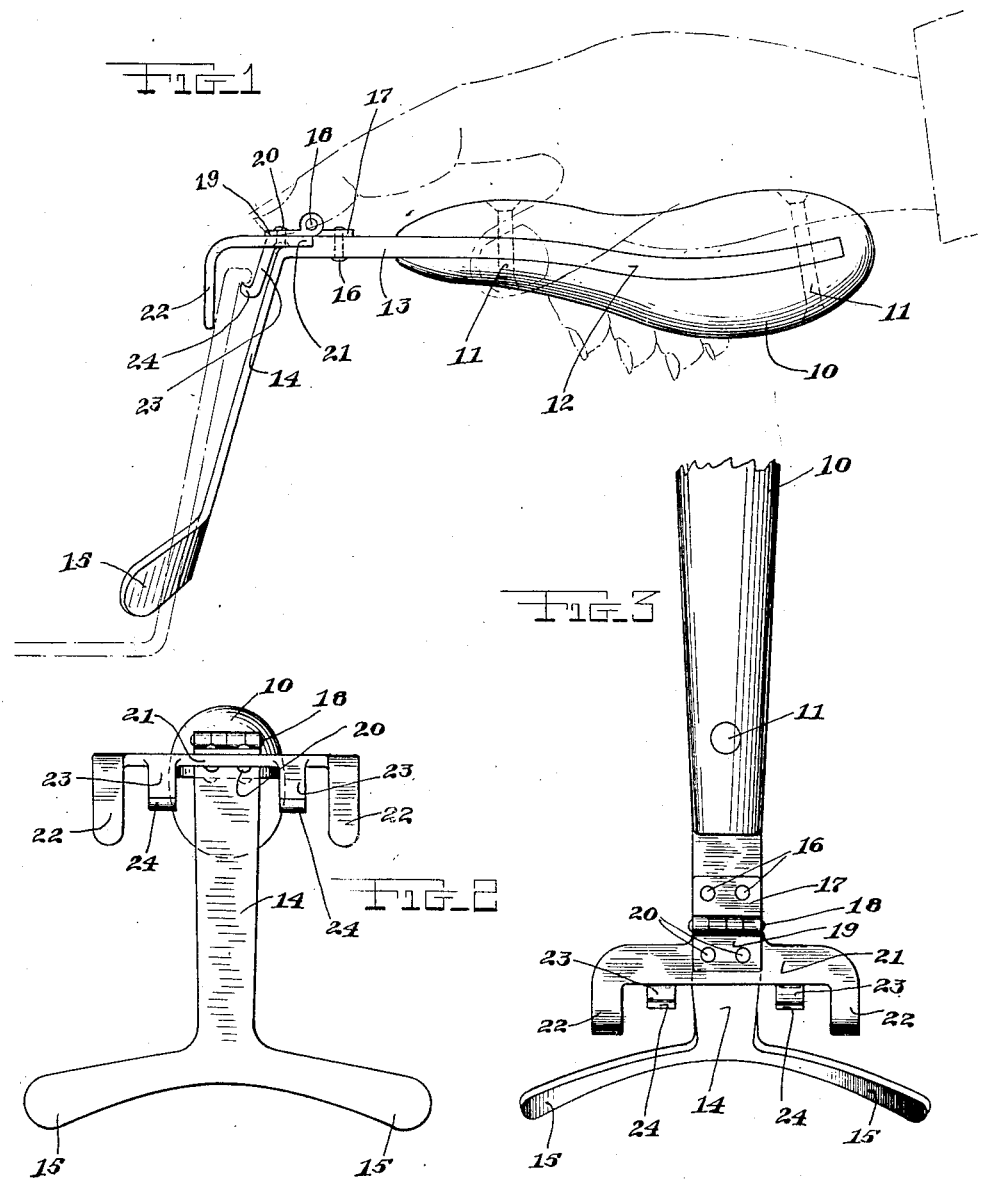

VLADYSLAW PUCHAZCKEVSKI, OF MONTREAL, QUEBEC, CANADA.

POT-LIFTER.

1,342,758. Specification of Letters Patent. Patented June 8, 1920.

Application filed August 14, 1919. Serial No. 317,449.

*To all whom it may concern:*

Be it known that I, VLADYSLAW PUCHAZCKEVSKI, a citizen of Poland, residing at Montreal, Province of Quebec, and Dominion of Canada, have invented certain new and useful Improvements in Pot-Lifters, of which the following is a specification.

This invention has for its object the provision of means whereby a hot vessel, as a pot, pan or the like, may be firmly grasped for manipulative purposes, without danger of burning the fingers of an operator.

This object is attained by the novel construction and combination of parts hereinafter described and shown in the accompanying drawings, forming a material part of this disclosure, and in which:—

Figure 1 is a side elevational view showing a pot lifter made in accordance with the invention and indicating its application.

Fig. 2 is a front elevational view thereof, and

Fig. 3 is a top plan view of the same.

Referring to the drawings in detail, the numeral 10 designates a peculiarly shaped handle, preferably made of wood or other non-conducting material, the shape being such as to conform to the palm of the hand as the implement is operated.

Firmly secured, centrally of the handle 10, is a bent metallic bar 12, the same extending out from the front or smaller end of the handle, as at 13, and extending diagonally downward from the part 13, is an arm 14, the angle corresponding to the general flaring sides of a vessel which it is adapted to engage.

The extremity of the arm is formed with lateral curved, oppositely disposed wing elements 15, adapted to make contact with the exterior of the vessel.

Fixed upon the upper portion of the extending bar 13, by the rivets 16, is one element 17 of a hinge, connected by a transverse pin 18, with the other hinge element 19 secured by rivets 20 to a transverse bar 21, extending equally in opposite directions, the bar having at its ends outturned elements 22, adapted to engage within the interior of a vessel near its upper edge.

Also formed with the transverse bar 21 are diagonal, downwardly disposed prongs 23, relatively shorter than the elements 22, and terminating with outwardly turned hooks 24, adapted to engage below the beading commonly formed with cooking vessels of the character indicated.

In operation, the handle is grasped and the hinged bar 21 turned slightly upward, so as to enable the hooks 24 to engage below the beading, while at the same time the elements 22 engage interiorly of the vessel. The handle is then moved slightly downward bringing the wings 15 into engagement with the sides of the vessel and by holding the finger on any part of the bar 21, while the hand is engaged with the handle so as to afford a firm and secure grip, the vessel, indicated by the broken line in Fig. 1, may be safely moved without the fingers making contact with the vessel, thus preventing them from becoming burned.

From the foregoing it will be seen that a convenient and practical implement has been disclosed whereby cooking vessels may be removed from the stove, the device affording an efficient and practical kitchen utensil.

Having thus described my invention what I claim as new and desire to secure by Letters Patent, is:—

In a pot lifter, the combination with a non-conducting handle suited to the palm of an operator's hand, a bar engaged in said handle, diagonally disposed downwardly extending arms formed at the extremity of said bar, wing elements disposed in opposite directions and curved to suit the exterior of the article to be lifted, a pair of spaced downwardly turned projections hingedly engaged with the extending ends of the first named bar, said projections being adapted to make contact with the exterior of the vessel, and a pair of hooks carried by said hinged elements, said hooks being adapted to engage below the beading of the article to be raised.

In testimony whereof I have affixed my signature.

VLADYSLAW PUCHAZCKEVSKI.